United States Patent
Matsumoto et al.

(10) Patent No.: US 11,929,501 B2
(45) Date of Patent: Mar. 12, 2024

(54) POSITIVE ELECTRODE ACTIVE MATERIAL FOR NON-AQUEOUS ELECTROLYTE SECONDARY BATTERY, AND METHOD FOR PRODUCING SAME

(71) Applicant: NICHIA CORPORATION, Anan (JP)

(72) Inventors: Hayaki Matsumoto, Anan (JP); Yoshitomo Miyashita, Tokushima (JP)

(73) Assignee: NICHIA CORPORATION, Anan (JP)

( * ) Notice: Subject to any disclaimer, the term of this patent is extended or adjusted under 35 U.S.C. 154(b) by 24 days.

(21) Appl. No.: 17/449,321

(22) Filed: Sep. 29, 2021

(65) Prior Publication Data

US 2022/0102719 A1    Mar. 31, 2022

(30) Foreign Application Priority Data

Sep. 30, 2020    (JP) .................................. 2020-165260

(51) Int. Cl.
*H01M 10/0525*    (2010.01)
*H01M 4/525*    (2010.01)
*H01M 4/02*    (2006.01)

(52) U.S. Cl.
CPC ....... *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 9,960,426 B2 | 5/2018 | Yasumiishi et al. |
| 2013/0280610 A1 | 10/2013 | Hwang et al. |
| 2021/0020930 A1 | 1/2021 | Choi et al. |

FOREIGN PATENT DOCUMENTS

| JP | 2002075367 A | 3/2002 |
| JP | 2006012433 A | 1/2006 |
| JP | 2011146390 A | 7/2011 |
| JP | 2014518000 A | 7/2014 |
| JP | 2015130272 A | 7/2015 |
| JP | 2016051504 A | 4/2016 |
| JP | 2018056034 A | 4/2018 |
| JP | 2020053390 A | 4/2020 |
| WO | 2019177328 A1 | 9/2019 |

*Primary Examiner* — Tanisha Diggs
(74) *Attorney, Agent, or Firm* — Hunton Andrews Kurth LLP

(57) ABSTRACT

A method for producing a positive electrode active material for a non-aqueous electrolyte secondary battery. The method includes providing a composition containing a first lithium transition metal composite oxide having a 50% particle size $^1D_{50}$ in a first volume cumulative particle size distribution of 0.1 μm or more and less than 3.2 μm and a first liquid medium; and granulating the composition to obtain a second lithium transition metal composite oxide having a 50% particle size $^2D_{50}$ in a second volume cumulative particle size distribution greater than $^1D_{50}$. The second lithium transition metal composite oxide has a ratio of a 90% particle size $^3D_{90}$ in a third volume cumulative particle size distribution measured after the ultrasonic treatment to a 90% particle size $^2D_{90}$ in the second volume cumulative particle size distribution measured before the ultrasonic treatment ($^3D_{90}/^2D_{90}$) of 0.53 or less.

13 Claims, No Drawings

POSITIVE ELECTRODE ACTIVE MATERIAL FOR NON-AQUEOUS ELECTROLYTE SECONDARY BATTERY, AND METHOD FOR PRODUCING SAME

CROSS-REFERENCE TO RELATED APPLICATIONS

This application claims priority to Japanese Patent Application No. 2020-165260, filed on Sep. 30, 2020, the disclosure of which is hereby incorporated by reference in its entirety.

BACKGROUND

The present disclosure relates to a positive electrode active material for a non-aqueous electrolyte secondary battery and a method for producing the same.

High output characteristics are required for positive electrode active materials for non-aqueous electrolyte secondary batteries for use in large power machines such as electric vehicles. To obtain high output characteristics, a positive electrode active material having a structure of secondary particles formed of many aggregated primary particles is considered to be effective. For example, Japanese Laid-Open Patent Publication No. 2015-130272 describes a positive electrode active material containing secondary particles composed of primary particles of two types of positive electrode active materials having different compositions and describes that high output can be obtained in various states of charge (SOC).

SUMMARY

A first aspect provides a method for producing a positive electrode active material for a non-aqueous electrolyte secondary battery, the method includes providing a composition containing a first lithium transition metal composite oxide having a 50% particle size $^1D_{50}$ in a first volume cumulative particle size distribution of 0.1 μm or more and less than 3.2 μm and a first liquid medium, and granulating the composition to obtain a second lithium transition metal composite oxide having a 50% particle size $^2D_{50}$ in a second volume cumulative particle size distribution greater than $^1D_{50}$. The second lithium transition metal composite oxide has different volume cumulative particle size distributions before and after an ultrasonic treatment in a second liquid medium and has a ratio of a 90% particle size $^3D_{90}$ in a third volume cumulative particle size distribution measured after the ultrasonic treatment to a 90% particle size $^2D_{90}$ in the second volume cumulative particle size distribution measured before the ultrasonic treatment ($^3D_{90}/^2D_{90}$) of 0.53 or less.

A second aspect provides a positive electrode active material for a non-aqueous electrolyte secondary battery, which includes a lithium transition metal composite oxide having a 90% particle size $^2D_{90}$ in a first volume cumulative particle size distribution. The lithium transition metal composite oxide has a ratio of a 90% particle size $^3D_{90}$ in a second volume cumulative particle size distribution measured after an ultrasonic treatment in a liquid medium to a 90% particle size $^2D_{90}$ in the first volume cumulative particle size distribution measured before the ultrasonic treatment ($^3D_{90}/^2D_{90}$) of 0.53 or less.

DETAILED DESCRIPTION

According to an aspect of the present disclosure, a method of producing a positive electrode active material improved in output characteristics in case of forming a positive electrode and improved in fluidity as a powder may be provided.

As used herein, the term "step" means not only an independent step but also a step which cannot be clearly distinguished from the other steps but that can achieve the desired object. When a plurality of substances corresponding to a component are present in a composition, the amount of the component means the total amount of the corresponding substances present in the composition unless otherwise specified. Embodiments of the present invention will now be described in detail. It should be noted that the embodiments described below are exemplifications of a positive electrode active material for a non-aqueous electrolyte secondary battery and a method for producing the same for embodying the technical ideas of the present invention, and the present invention is not limited to the positive electrode active material for a non-aqueous electrolyte secondary battery and the method for producing the same described below.

For a technique of obtaining high output characteristics, it is conceivable that a particle size of a positive electrode active material is reduced to increase a specific surface area. However, when the particle size of the positive electrode active material is reduced, the fluidity of the positive electrode active material decreases as a powder, so that the productivity tends to decrease. An object of an aspect of the present disclosure is to provide a positive electrode active material for a non-aqueous electrolyte secondary battery improved in output characteristics at the time of forming a positive electrode and improved in fluidity as a powder, and a method for producing the same.

Method for Producing Positive Electrode Active Material for Non-Aqueous Electrolyte Secondary Battery A method for producing a positive electrode active material for a non-aqueous electrolyte secondary battery includes providing a composition containing a first lithium transition metal composite oxide having a 50% particle size $^1D_{50}$ in a first volume cumulative particle size distribution of 0.1 μm or more and less than 3.2 μm and a first liquid medium, and granulating the composition to obtain a second lithium transition metal composite oxide having a 50% particle size $^2D_{50}$ in a second volume cumulative particle size distribution greater than $^1D_{50}$. The second lithium transition metal composite oxide has different volume cumulative particle size distributions before and after an ultrasonic treatment in a second liquid medium and has a ratio of a 90% particle size $^3D_{90}$ in a third volume cumulative particle size distribution measured after the ultrasonic treatment to a 90% particle size $^2D_{90}$ in the second volume cumulative particle size distribution measured before the ultrasonic treatment ($^3D_{90}/^2D_{90}$) of 0.53 or less.

By granulating the composition containing primary particles (the first lithium transition metal composite oxide) containing a lithium transition metal composite oxide having a relatively small particle size (the 50% particle size $^1D_{50}$ in the volume cumulative particle size distribution of 0.1 μm or more and less than 3.2 μm) and the first liquid medium, the primary particles are aggregated to form secondary particles (the second lithium transition metal composite oxide) having a relatively large particle size (the 50% particle size $^2D_{50}$ in the volume cumulative particle size distribution greater than $^1D_{50}$). Since the secondary particles have a large particle size, the fluidity is improved as a powder, so that the positive electrode active material containing the secondary particles is improved in productivity. The productivity means, for example, suppression of clogging of a sieve. Since the secondary particles formed by granulation have different volume cumulative particle size distributions before and after the ultrasonic treatment in a second liquid medium and have a ratio of the 90% particle size $^3D_{90}$ in the volume cumulative particle size distribution measured after the ultrasonic treatment to the 90% particle size $^2D_{90}$ in the volume cumulative particle size distribution measured before the ultrasonic treatment ($^3D_{90}/^2D_{90}$) of 0.53 or less, the primary particles are considered to be regenerated by the ultrasonic treatment in the second liquid medium. An electrode active material layer is generally formed from a liquid electrode composition containing a positive electrode active material. When the electrode composition is prepared by using the positive electrode active material containing the granulated secondary particles, the primary particles are regenerated in the electrode composition. Therefore, the positive electrode active material layer formed from the electrode composition contains the positive electrode active material in the form of the primary particles. The positive electrode active material in the form of the primary particles has a relatively large specific surface area due to the particle size thereof and can achieve high output characteristics in a battery.

The providing step comprises providing the composition containing the first lithium transition metal composite oxide having the 50% particle size $^1D_{50}$ in the volume cumulative particle size distribution of 0.1 μm or more and less than 3.2 μm and the first liquid medium. The 50% particle size $^1D_{50}$ of the first lithium transition metal composite oxide is preferably 0.12 μm or more and 2.5 μm or less, more preferably 0.13 μm or more and 2 μm or less, from the viewpoint of output characteristics when a battery is formed. The 50% particle size is obtained as a particle size corresponding to 50% volume accumulation from the smaller particle size side in the volume cumulative particle size distribution.

A 90% particle size $^1D_{90}$ in the volume cumulative particle size distribution of the first lithium transition metal composite oxide is 0.13 μm or more and 5 μm or less, preferably 0.15 μm or more and 3 μm or less, from the viewpoint of output characteristics when a battery is formed. The 90% particle size is obtained as a particle size corresponding to 90% volume accumulation from the smaller particle size side in the volume cumulative particle size distribution.

The 50% particle size $^1D_{50}$ and the 90% particle size $^1D_{90}$ of the first lithium transition metal composite oxide can be controlled by appropriately selecting a particle size and a heat treatment condition of a composite oxide serving as a raw material at the time of production of the first lithium transition metal composite oxide. Alternatively, the lithium transition metal composite oxide having $^1D_{50}$ of 3.2 μm or more may be subjected to a pulverization treatment such that a desired particle size distribution is achieved. The pulverization treatment may be, for example, wet pulverization in a liquid medium using a ball mill etc., or dry pulverization using a jet mill etc.

The first lithium transition metal composite oxide may be, for example, any of a lithium transition metal composite oxide having a layered structure, a lithium transition metal composite oxide having an olivine structure, and a lithium transition metal composite oxide having a spinel structure.

Regarding the lithium transition metal composite oxide having a layered structure, the lithium transition metal composite oxide containing cobalt may be lithium cobalt oxide. Lithium cobalt oxide may contain at least one metal element $M^1$ in addition to lithium and cobalt. Examples of the metal element $M^1$ comprise nickel (Ni), manganese (Mn), aluminum (Al), magnesium (Mg), calcium (Ca), titanium (Ti), zirconium (Zr), niobium (Nb), thallium (Ta), chromium (Cr), molybdenum (Mo), iron (Fe), copper (Cu), silicon (Si), tin (Sn), bismuth (Bi), gallium (Ga), yttrium (Y), samarium (Sm), erbium (Er), cerium (Ce), neodymium (Nd), lanthanum (La), cadmium (Cd), lutetium (Lu), etc., and the metal element $M^1$ may be at least one selected from the group consisting thereof.

The ratio of the number of moles of cobalt to the total number of moles of metal other than lithium in the lithium transition metal composite oxide containing cobalt having a layered structure may be 1 or less, for example.

When the lithium transition metal composite oxide containing cobalt having a layered structure contains the metal element $M^1$, the ratio of the number of moles of the metal element $M^1$ to the total number of moles of metal other than lithium may be 0.1 or less, for example.

The ratio of the number of moles of lithium to the total number of moles of metal other than lithium in the lithium transition metal composite oxide containing cobalt having a layered structure may be 0.9 or more and 1.2 or less, for example.

The lithium transition metal composite oxide containing cobalt having a layered structure may have, for example, a composition represented by Formula (1).

$$Li_pCo_xM^1_yO_2 \qquad (1)$$

In Formula (1), 0.9≤p≤1.2, 0<x≤1, 0≤y≤0.1, and x+y≤1 may be satisfied. $M^1$ may be at least one selected from the group consisting of Ni, Mn, Al, Mg, Ca, Ti, Zr, Nb, Ta, Cr, Mo, Fe, Cu, Si, Sn, Bi, Ga, Y, Sm, Er, Ce, Nd, La, Cd, and Lu.

Regarding the lithium transition metal composite oxide having a layered structure, the lithium transition metal composite oxide containing nickel contains at least lithium (Li) and nickel (Ni). The lithium transition metal composite oxide containing nickel may contain at least one selected from the group consisting of cobalt (Co), manganese (Mn), and aluminum (Al), in addition to lithium and nickel. The lithium transition metal composite oxide containing nickel may contain a metal element $M^2$ in addition to lithium, nickel, cobalt, manganese, and aluminum. Examples of the metal element $M^2$ comprise zirconium (Zr), titanium (Ti), magnesium (Mg), tantalum (Ta), niobium (Nb), and molybdenum (Mo), and the metal element $M^2$ may be at least one selected from the group consisting thereof.

The ratio of the number of moles of nickel to the total number of moles of metal other than lithium in the lithium transition metal composite oxide containing nickel having a layered structure may be 0.3 or more and less than 1, for example.

When the lithium transition metal composite oxide containing nickel having a layered structure contains cobalt, the ratio of the number of moles of cobalt to the total number of moles of metal other than lithium may be 0.7 or less, for example.

When the lithium transition metal composite oxide containing nickel having a layered structure contains manganese, the ratio of the number of moles of manganese to the total number of moles of metal other than lithium may be 0.7 or less, for example.

When the lithium transition metal composite oxide containing nickel having a layered structure contains aluminum, the ratio of the number of moles of aluminum to the total number of moles of metal other than lithium may be 0.7 or less, for example.

When the lithium transition metal composite oxide containing nickel having a layered structure contains the metal element $M^2$, the ratio of the number of moles of the metal element $M^2$ to the total number of moles of metal other than lithium may be 0.02 or less, for example.

The ratio of the number of moles of lithium to the total number of moles of metal other than lithium in the lithium transition metal composite oxide containing nickel having a layered structure may be 1.0 or more and 1.5 or less, for example.

The lithium transition metal composite oxide containing nickel having a layered structure may have, for example, a composition represented by Formula (2).

$$Li_pNi_xCo_yMn_zAl_wM^2_uO_2 \qquad (2)$$

In Formula (2), $1.0 \le p \le 1.5$, $0.3 \le x < 1$, $0 \le y \le 0.7$, $0 \le z \le 0.7$, $0 \le w \le 0.7$, $0 \le u \le 0.02$, and $x+y+z+w+u \le 1$ may be satisfied. $M^2$ may be at least one selected from the group consisting of Zr, Ti, Mg, Ta, Nb, and Mo.

Regarding the lithium transition metal composite oxide having an olivine structure, the lithium transition metal composite oxide containing iron contains at least lithium (Li), iron (Fe), and phosphorus (P). The lithium transition metal composite oxide containing iron may contain a metal element $M^3$ in addition to lithium, iron, and phosphorus. Examples of the metal element $M^3$ comprise cobalt (Co), manganese (Mn), and nickel (Ni), and the metal element $M^3$ may be at least one selected from the group consisting thereof. The lithium transition metal composite oxide containing iron may contain a metal element $M^4$ in addition to lithium, iron, phosphorus, and the metal element $M^3$. Examples of the metal element $M^4$ comprise molybdenum (Mo), magnesium (Mg), zirconium (Zr), titanium (Ti), aluminum (Al), cerium (Ce), and chromium (Cr), and the metal element $M^4$ may be at least one selected from the group consisting thereof.

The ratio of the number of moles of iron to the total number of moles of metal other than lithium in the lithium transition metal composite oxide containing iron having an olivine structure may be more than 0 and 1 or less, for example.

When the lithium transition metal composite oxide containing iron having an olivine structure contains the metal element $M^3$, the ratio of the number of moles of the metal element $M^3$ to the total number of moles of metal other than lithium may be less than 1, for example.

When the lithium transition metal composite oxide containing iron having an olivine structure contains the metal element $M^4$, the ratio of the number of moles of the metal element $M^4$ to the total number of moles of metal other than lithium may be 0.3 or less, for example.

The ratio of the number of moles of lithium to the total number of moles of metal other than lithium in the lithium transition metal composite oxide containing iron having an olivine structure may be 0.9 or more and 1.3 or less, for example.

The lithium transition metal composite oxide containing iron having an olivine structure may have, for example, a composition represented by Formula (3).

$$Li_pFe_xM^3_yM^4_zPO_4 \qquad (3)$$

In Formula (3), $0.9 \le p \le 1.3$, $0 < x \le 1$, $0 \le y < 1$, $0 \le z \le 0.3$, and $x+y+z \le 1$ may be satisfied. $M^3$ may be at least one selected from the group consisting of Co, Mn, and Ni. $M^4$ is at least one selected from the group consisting of Mo, Mg, Zr, Ti, Al, Ce, and Cr.

Regarding the lithium transition metal composite oxide having a spinel structure, the lithium transition metal composite oxide containing manganese contains at least lithium (Li) and manganese (Mn). The lithium transition metal composite oxide containing manganese may contain a metal element $M^5$ in addition to lithium and manganese. Examples of the metal element $M^5$ comprise aluminum (Al), magnesium (Mg), silicon (Si), titanium (Ti), chromium (Cr), iron (Fe), cobalt (Co), copper (Cu), zinc (Zn), and gallium (Ga), and the metal element $M^5$ may be at least one selected from the group consisting thereof.

The ratio of the number of moles of Mn to the total number of moles of metal other than lithium in the lithium transition metal composite oxide containing manganese having a spinel structure may be more than 0 and 2 or less, for example.

When the lithium transition metal composite oxide containing manganese having a spinel structure contains the metal element $M^5$, the ratio of the number of moles of the metal element $M^5$ to the total number of moles of metal other than lithium may be 0.2 or less, for example.

The ratio of the number of moles of lithium to the total number of moles of metal other than lithium in the lithium transition metal composite oxide containing manganese having a spinel structure may be 1 or more and 1.4 or less, for example.

The lithium transition metal composite oxide having a spinel structure may have, for example, a composition represented by Formula (4).

$$Li_pMn_xM^5_yO_4 \qquad (4)$$

In Formula (4), $1 \le p \le 1.4$, $0 < x \le 2$, $0 \le y \le 0.2$, and $x+y \le 2$ may be satisfied. $M^5$ may be at least one selected from the group consisting of Al, Mg, Si, Ti, Cr, Fe, Co, Cu, Zn, and Ga.

Regarding the lithium transition metal composite oxide having a spinel structure, the lithium transition metal composite oxide containing nickel and manganese contains at least lithium (Li), nickel (Ni), and manganese (Mn). The lithium transition metal composite oxide containing nickel and manganese may contain a metal element $M^6$ in addition to lithium, nickel, and manganese. Examples of the metal element $M^6$ comprise aluminum (Al), magnesium (Mg), silicon (Si), titanium (Ti), chromium (Cr), iron (Fe), cobalt (Co), copper (Cu), zinc (Zn), and gallium (Ga), and the metal element $M^6$ may be at least one selected from the group consisting thereof.

The ratio of the number of moles of nickel to the total number of moles of metal other than lithium in the lithium transition metal composite oxide containing nickel and manganese having a spinel structure may be 0.3 or more and 0.6 or less, for example.

The ratio of the number of moles of manganese to the total number of moles of metal other than lithium in the lithium transition metal composite oxide containing nickel and manganese having a spinel structure may be 1.2 or more and 1.7 or less, for example.

When the lithium transition metal composite oxide containing nickel and manganese having a spinel structure contains the metal element $M^6$, the ratio of the number of moles of the metal element $M^6$ to the total number of moles of metal other than lithium may be 0.2 or less, for example.

The ratio of the number of moles of lithium to the total number of moles of metal other than lithium in the lithium transition metal composite oxide containing nickel and manganese having a spinel structure may be 1 or more and 1.4 or less, for example.

The lithium transition metal composite oxide containing nickel and manganese having a spinel structure may have, for example, a composition represented by Formula (5).

$$Li_pNi_xMn_yM^6_zO_4 \quad (5)$$

In Formula (5), $1 \le p \le 1.4$, $0.3 \le x \le 0.6$, $1.2 \le y \le 1.7$, $0 \le z \le 0.2$, and $x+y+z \le 2$ may be satisfied. $M^6$ may be at least one selected from the group consisting of Al, Mg, Si, Ti, Cr, Fe, Co, Cu, Zn, and Ga.

The first liquid medium contained in the composition is preferably water from the viewpoint of the binding property between particles of the second lithium transition metal composite oxide, and the composition may further contain a water-soluble organic solvent such as alcohol or acetone in addition to water. The composition may be formed as a slurry having a fluidity. The solid content concentration of the first lithium transition metal composite oxide in the composition may be, for example, 5 mass % or more and 30 mass % or less, preferably 10 mass % or more and 20 mass % or less.

The composition may contain other components in addition to the first lithium transition metal composite oxide and the first liquid medium, depending on the binding property of the particles of the second lithium transition metal composite oxide. Examples of the other components comprise a binder, a dispersant, etc. When the composition contains the other components, the content thereof may be, for example, 10 mass % or less, preferably 5 mass % or less, and preferably 1 mass % or less. The lower limit of the content may be, for example, 0.01 mass % or more.

The composition can be prepared by mixing the first lithium transition metal composite oxide and the first liquid medium. For example, the composition can be prepared by mixing by a mixing device equipped with a stirring blade. The composition obtained by mixing may be subjected to a dispersion treatment. The dispersion treatment can be performed as a wet treatment using a ball mill, for example.

In the granulation step, the prepared composition is granulated to obtain the second lithium transition metal composite oxide having the 50% particle size $^2D_{50}$ in the second volume cumulative particle size distribution greater than $^1D_{50}$. The obtained second lithium transition metal composite oxide has different volume cumulative particle size distributions before and after an ultrasonic treatment in the second liquid medium and has a ratio of the 90% particle size $^3D_{90}$ in the third volume cumulative particle size distribution measured after the ultrasonic treatment to the 90% particle size $^2D_{90}$ in the second volume cumulative particle size distribution measured before the ultrasonic treatment ($^3D_{90}/^2D_{90}$) of 0.53 or less.

At the granulation step, at least a portion of the first liquid medium is removed by drying the prepared composition, so as to obtain the second lithium transition metal composite oxide having the 50% particle size $^2D_{50}$ in the second volume cumulative particle size distribution greater than $^1D_{50}$. Examples of a method of drying the composition comprise spray drying, fluidized bed drying, etc. Spray drying is preferable since the particle size of the second lithium transition metal composite oxide can easily be adjusted.

The 50% particle size $^2D_{50}$ of the second lithium transition metal composite oxide may be, for example, 2 μm or more, preferably 2.3 μm or more, more preferably 2.5 μm or more, from the viewpoint of fluidity as a powder. The $^2D_{50}$ may be, for example, 50 μm or less, preferably 30 μm or less, and more preferably 15 μm or less. The 50% particle size is obtained as a particle size corresponding to 50% volume accumulation from the smaller particle size side in the volume cumulative particle size distribution.

The 90% particle size $^2D_{90}$ in the volume cumulative particle size distribution of the second lithium transition metal composite oxide may be greater than 3.6 μm, preferably 5 μm or more, more preferably 6 μm or more, from the viewpoint of fluidity as a powder. The $^2D_{90}$ may be, for example, 55 μm or less, preferably 35 μm or less, more preferably 25 μm or less. The 90% particle size is obtained as a particle size corresponding to 90% volume accumulation from the smaller particle size side in the volume cumulative particle size distribution.

The ratio of the 50% particle size of the second lithium transition metal composite oxide to the 50% particle size of the first lithium transition metal composite oxide ($^2D_{50}/^1D_{50}$) may be, for example, greater than 1, preferably 1.5 or more, from the viewpoint of fluidity as a powder. The ratio ($^2D_{50}/^1D_{50}$) may be, for example, 500 or less, preferably 300 or less.

The ratio of the 90% particle size of the second lithium transition metal composite oxide to the 90% particle size of the first lithium transition metal composite oxide ($^2D_{90}/^1D_{90}$) may be, for example, greater than 1, preferably 1.5 or more, from the viewpoint of fluidity as a powder. The ratio ($^2D_{90}/^1D_{90}$) may be, for example, 500 or less, preferably 300 or less.

The second lithium transition metal composite oxide may have different volume cumulative particle size distributions before and after the ultrasonic treatment in the second liquid medium. The second lithium transition metal composite oxide is formed as a granulated product (secondary particles) of the first lithium transition metal composite oxide forming the primary particles. The granulated product has a low physical strength and therefore at least partially disintegrates due to application of appropriate energy so that the primary particles are regenerated. Therefore, by applying ultrasonic waves to the second lithium transition metal composite oxide in the second liquid medium, at least a portion of the primary particles constituting the granulated product is regenerated, and the particle size distribution is changed. For example, the 50% particle size $^2D_{50}$ and the 90% particle size $^2D_{90}$ in the volume cumulative particle size distribution of the second lithium transition metal composite oxide constituting the positive electrode active material have respective values greater than a 50% particle size $^3D_{50}$ and the 90% particle size $^3D_{90}$ measured after the ultrasonic treatment in the second liquid medium of the second lithium transition metal composite oxide. A condition of the ultrasonic treatment in this description is that 0.05 g of the second lithium transition metal composite oxide is dispersed in 200 ml of water containing 0.05 mass % of sodium hexametaphosphate and irradiated with ultrasonic waves at 20° C. for 20 seconds by using an ultrasonic wave irradiation device having a frequency of 40 kHz and an output of 110 W.

The 50% particle size $^3D_{50}$ of the second lithium transition metal composite oxide measured after the ultrasonic treatment in the second liquid medium may be, for example, 0.1 μm or more and less than 3.2 μm, preferably 0.11 μm or more and 2.5 μm or less, from the viewpoint of output characteristics when a battery is formed. The 50% particle size is obtained as a particle size corresponding to 50% volume accumulation from the smaller particle size side in the volume cumulative particle size distribution.

The 90% particle size $^3D_{90}$ of the second lithium transition metal composite oxide measured after the ultrasonic treatment in the second liquid medium may be, for example, 0.1 μm or more and 5 μm or less, preferably 0.15 μm or more and 3 μm or less, from the viewpoint of output characteristics when a battery is formed. The 90% particle size is obtained as a particle size corresponding to 90% volume accumulation from the smaller particle size side in the volume cumulative particle size distribution.

The ratio of $^3D_{90}$ to $^2D_{90}$ ($^3D_{90}/^2D_{90}$) of the second lithium transition metal composite oxide may be, for example, greater than 0 and 0.53 or less, preferably 0.5 or less, more preferably 0.3 or less, from the viewpoint of output characteristics when a battery is formed.

The ratio of $^3D_{50}$ to $^2D_{50}$ ($^3D_{50}/^2D_{50}$) of the second lithium transition metal composite oxide may be, for example, greater than 0 and 0.53 or less, preferably 0.5 or less, more preferably 0.3 or less, from the viewpoint of output characteristics when a battery is formed.

The ratio of the 50% particle size $^3D_{50}$ measured after the ultrasonic treatment in the second liquid medium of the second lithium transition metal composite oxide to the 50% particle size $^1D_{50}$ in the volume cumulative particle size distribution of the first lithium transition metal composite oxide ($^3D_{50}/^1D_{50}$) may be, for example, 0.8 or more and 1.5 or less, preferably 0.95 or more and 1.1 or less, from the viewpoint of output characteristics when a battery is formed.

The ratio of the 90% particle size $^3D_{90}$ measured after the ultrasonic treatment in the second liquid medium of the second lithium transition metal composite oxide to the 90% particle size $^1D_{90}$ in the volume cumulative particle size distribution of the first lithium transition metal composite oxide ($^3D_{90}/^1D_{90}$) may be, for example, 0.8 or more and 2 or less, preferably 0.95 or more and 1.5 or less, from the viewpoint of output characteristics when a battery is formed.

The second lithium transition metal composite oxide is formed by spray drying of the composition, for example. Conditions, a device, etc. for spray drying may appropriately be selected. For example, by dispersing the composition in a drying chamber of a spraying device equipped with one or more nozzles for introducing the composition and one or more nozzles for airflow and removing at least a portion of the first liquid medium from the composition, an intended dried product is obtained. Conditions such as a flow rate of each nozzle, a flow rate ratio between nozzles, and a temperature of the drying chamber may be adjusted such that the second lithium transition metal composite oxide has $^2D_{50}$ greater than $^1D_{50}$ and the ratio of the 90% particle size $^3D_{90}$ in the volume cumulative particle size distribution measured after the ultrasonic treatment to the 90% particle size $^2D_{90}$ in the volume cumulative particle size distribution measured before the ultrasonic treatment in the second liquid medium ($^3D_{90}/^2D_{90}$) of 0.53 or less.

Regarding the specific conditions of spray drying, for example, a ratio of a supply amount of a gas to a supply amount of the composition may be, for example, 500 or more and 4000 or less, preferably 800 or more and 2000 or less. The drying temperature may be, for example, 100° C. or higher and 170° C. or lower, preferably 130° C. or higher and 160° C. or lower.

Preferably, the second lithium transition metal composite oxide obtained by spray drying is not subjected to an additional heat treatment. The additional heat treatment means applying heat of, for example, 250° C. or higher, preferably 300° C. or higher to the second lithium transition metal composite oxide. When an additional heat treatment is performed, the adhesive force is improved between the primary particles, so that the disintegration of the secondary particles may be suppressed.

Positive Electrode Active Material for Non-Aqueous Electrolyte Secondary Battery The positive electrode active material for a non-aqueous electrolyte secondary battery contains a lithium transition metal composite oxide having volume cumulative particle size distribution changed after the ultrasonic treatment in the second liquid medium. The lithium transition metal composite oxide may have the ratio of the 90% particle size $^3D_{90}$ in the volume cumulative particle size distribution measured after the ultrasonic treatment to the 90% particle size $^2D_{90}$ in the volume cumulative particle size distribution measured before the ultrasonic treatment ($^3D_{90}/^2D_{90}$) of 0.53 or less.

Since the positive electrode active material is configured to contain a lithium transition metal composite oxide having volume cumulative particle size distribution changed after the ultrasonic treatment in the second liquid medium, the positive electrode active material can have excellent fluidity as a powder. Since the volume cumulative particle size distribution is changed after the ultrasonic treatment and the ratio ($^3D_{90}/^2D_{90}$) is 0.53 or less, high output characteristics can be achieved when a non-aqueous electrolyte secondary battery is formed.

The lithium transition metal composite oxide constituting the positive electrode active material may be, for example, the second lithium transition metal composite oxide manufactured by the producing method described above. The details of an example of the second lithium transition metal composite oxide are as described above.

Electrode for Non-Aqueous Electrolyte Secondary Battery

An electrode for a non-aqueous electrolyte secondary battery comprises a collector and a positive electrode active material layer disposed on the collector and containing the positive electrode active material for a non-aqueous secondary battery produced by the producing method. The non-aqueous electrolyte secondary battery comprising the electrode can achieve a high initial efficiency and a high durability.

Examples of the material of the current collector comprise aluminum, nickel, stainless steel, etc. The positive electrode active material layer is formed by applying a positive electrode composition obtained by mixing the positive electrode active material described above, a conductive material, a binder, etc. together with a solvent onto the collector and performing a drying treatment, a pressure treatment, etc. Examples of the conductive material comprise natural graphite, artificial graphite, acetylene black, etc. Examples of the binder comprise polyvinylidene fluoride, polytetrafluoroethylene, and polyamide acrylic resin.

Non-Aqueous Electrolyte Secondary Battery

The non-aqueous electrolyte secondary battery comprises the electrode for a non-aqueous electrolyte secondary battery as a positive electrode. The non-aqueous electrolyte secondary battery comprises, in addition to the electrode for a non-aqueous electrolyte secondary battery, a negative electrode for a non-aqueous electrolyte secondary battery, a non-aqueous electrolyte, a separator, etc. For example, materials for a non-aqueous secondary battery described in Japanese Laid-Open Patent Publication Nos. 2002-075367, 2011-146390, and 2006-12433 (incorporated herein by reference in their entirety) may appropriately be used for the negative electrode, the non-aqueous electrolyte, the separator, etc. in the non-aqueous electrolyte secondary battery.

EXAMPLES

Examples according to the present invention will hereinafter specifically be described; however, the present invention is not limited to these examples.

First, a method of measuring physical properties in the following Examples and Comparative Examples will be described. For $^1D_{50}$, $^2D_{50}$, $^3D_{50}$, $^1D_{90}$, $^2D_{90}$, and $^3D_{90}$, the cumulative particle size distribution based on volume was measured by using a laser diffraction type particle size distribution measuring device (MASTER SIZER) so as to obtain the 50% particle size and the 90% particle size in accordance with 50% accumulation and 90% accumulation, respectively, from the small diameter side. For $^1D_{50}$ and $^1D_{50}$, the prepared lithium transition metal composite oxide was subjected to the ultrasonic treatment (frequency: 40 kHz; output: 110 W; 20° C.; 20 seconds; a 0.05 mass % sodium hexametaphosphate dispersant was added to 200 mL of pure water) before measurement. For $^3D_{50}$ and $^3D_{90}$, the lithium transition metal composite oxide used for the measurement of $^2D_{50}$ was subjected to the ultrasonic treatment (frequency: 40 kHz; output: 110 W; 20° C.; 20 seconds; a 0.05 mass % sodium hexametaphosphate dispersant was added to 200 mL of pure water) before measurement.

Example 1

Preparation of Precursor

A cobalt sulfate aqueous solution was dropped into pure water being stirred at 60° C. and a rotation speed of 650 rpm. At the same time, a 7.9 mol/L sodium hydroxide aqueous solution was dropped to pH of 8.0. After the dropping of the cobalt sulfate aqueous solution was completed, only the sodium hydroxide aqueous solution was continuously dropped until pH of 9.4 or more and 9.8 or less to obtain a precipitate containing cobalt. The obtained precipitate was filtered, washed with water, and heat-treated at 330° C. for 17 hours to obtain a composite oxide containing cobalt.

Preparation of Lithium Transition Metal Composite Oxide

Lithium carbonate is weighed so that the ratio of the number of moles of lithium to cobalt contained in the composite oxide containing cobalt is 1.01, and the composite oxide containing cobalt and the lithium carbonate were dry-mixed to obtain a lithium mixture. The obtained lithium mixture was heat-treated at 700° C. for 5 hours in the atmosphere and then continuously heat-treated at 800° C. for 5 hours to obtain a sintered body.

Dispersion Treatment

The obtained sintered body was put into pure water to produce a slurry having a slurry concentration of 20 mass %. The obtained slurry was dispersed by a ball mill (00.65 n, zirconium oxide pellet) for 150 minutes to obtain a dispersion slurry. Table 1 shows the physical characteristics ($^1D_{50}$, $^1D_{90}$) of the first lithium transition metal composite oxide in the obtained dispersion slurry.

Spray Drying

The obtained dispersion slurry containing the lithium transition metal composite oxide and air were introduced into a spray nozzle at flow rates of 16 mL/min and 30 L/min, respectively, and spray drying was performed at a drying temperature of 250° C. to obtain a positive electrode active material of Example 1 containing a second lithium transition metal composite oxide. Table 1 shows the physical characteristics ($^2D_{50}$, $^2D_{90}$, $^3D_{50}$, $^3D_{90}$) of the obtained second lithium transition metal composite oxide of Example 1.

Comparative Example 1

A dispersion slurry containing the first lithium transition metal composite oxide was obtained as in Example 1. The obtained dispersion slurry was filtered with a Büchner funnel (filter paper: ADVANTEC qualitative filter paper, 5 C, 285 mm) and the obtained filtered product was allowed to stand and dried at a drying temperature of 150° C. to obtain a positive electrode active material containing a lithium transition metal composite oxide of Comparative Example 1. Table 1 shows the physical characteristics ($^2D_{50}$, $^2D_{90}$, $^3D_{50}$, $^3D_{90}$) of the lithium transition metal composite oxide of Comparative Example 1.

Comparative Example 2

A sintered body was obtained as in Example 1 except that the heat treatment conditions of the lithium mixture were changed such that the mixture was heat-treated at 700° C. for 5 hours in the atmosphere and then continuously heat-treated at 880° C. for 5 hours. The obtained sintered body was subjected to a dispersion treatment by a dry vibration mill (Chuo Kakohki, B-2 type, UX-Φ25Fe core) for 15 minutes, and the obtained dispersion product was then put into pure water to produce a dispersion slurry having a slurry concentration of 20 mass %. Table 1 shows the physical characteristics ($^1D_{50}$, $^1D_{90}$) of the lithium transition metal composite oxide in the obtained dispersion slurry.

The dispersion slurry obtained above was dried as in Comparative Example 1 to obtain a positive electrode active material containing a lithium transition metal composite oxide of Comparative Example 2. Table 1 shows the physical characteristics ($^2D_{50}$, $^2D_{90}$, $^3D_{50}$, $^3D_{90}$) of the lithium transition metal composite oxide of Comparative Example 2.

Comparative Example 3

The spray-drying was performed as in Example 1 and then followed by the heat treatment at 400° C. in the atmosphere to obtain a positive electrode active material containing a lithium transition metal composite oxide of Comparative Example 3. Table 1 shows the physical characteristics ($^2D_{50}$, $^2D_{90}$, $^3D_{50}$, $^3D_{90}$) of the lithium transition metal composite oxide of Comparative Example 3.

Sieving Rate

By sieving 300 g of the lithium transition metal composite oxide obtained in Example 1 and Comparative Examples 1 to 3 for 60 seconds with a sieve having a diameter of 30 cm with 70 μm openings (gyro shifter, 60 Hz), an amount of the passing oxide per unit area (kg/h m$^2$) was measured. The results are shown in Table 1.

Fabrication of Positive Electrode

After mixing 11.6 g of the lithium transition metal composite oxide obtained in Example 1 and Comparative Examples 1 to 3 and 1.5 g of a solution of polyvinylidene fluoride (hereinafter referred to as PVDF) (0.12 g as PVDF) dissolved in N-methyl-2-pyrrolidone (hereinafter referred to as NMP), 1.2 g of an acetylene black (hereinafter referred to as AB) solution (0.24 g as AB) was further added and mixed to obtain a positive electrode composition. An NMP slurry was prepared by mixing with NMP such that the concentration of the positive electrode composition was 58 mass %. The obtained NMP slurry was applied to an aluminum foil serving as a collector and dried to obtain a dry product. The dry product was compression-molded by a roll press and then cut into a predetermined size to fabricate a positive electrode.

Fabrication of Negative Electrode

A graphite material was used as a negative electrode active material. A negative electrode paste was prepared by kneading 97.5 parts by mass of the negative electrode active material, 1.5 parts by mass of carboxymethyl cellulose (CMC), and 1.0 part by mass of styrene butadiene rubber (SBR) dispersed in water. This paste was applied to a collector made of copper foil, dried, compression-molded by a roll press after drying, and then cut into a predetermined size to fabricate a negative electrode.

Preparation of Non-Aqueous Electrolytic Solution

Ethyl carbonate and methyl ethyl carbonate are mixed at a volume ratio of 3:7 to obtain a mixed solvent. Lithium hexafluorophosphate was dissolved at a concentration of 1.0 mol in the obtained mixed solvent to obtain a non-aqueous electrolytic solution.

Assembly of Non-Aqueous Electrolyte Secondary Battery

After respective lead electrodes were attached to the collectors of the positive and negative electrodes, vacuum drying was performed at 120° C. Subsequently, a separator made of porous polyethylene is arranged between the positive electrode and the negative electrode, and these were stored in a bag-shaped laminate pack. After storage, vacuum drying was performed at 60° C. to remove water adsorbed in the members. After vacuum drying, the non-aqueous electrolytic solution was injected and sealed in the laminate pack to obtain a laminated non-aqueous electrolyte secondary battery as an evaluation battery. The following battery characteristics were evaluated by using the obtained evaluation battery.

Average Voltage

After constant-current/constant-voltage charging with a full-charge voltage of 4.45 V at a charge rate of 0.2 C, a constant-current discharge was performed with a discharge voltage of 2.0 V at a discharge rate of 2 C. A time average of battery voltage at the time of the constant-current discharge at a discharge rate of 2 C was used as an average voltage. The results are shown in Table 1.

TABLE 1

|  | Condition | $^1D_{50}$ (μm) | $^1D_{90}$ (μm) | $^2D_{50}$ (μm) | $^2D_{90}$ (μm) | $^3D_{50}$ (μm) | $^3D_{90}$ (μm) | Aggregabiliy ($^3D_{90}/^2D_{90}$) | Sieving Rate (kg/h·m²) | Average voltage (V) |
|---|---|---|---|---|---|---|---|---|---|---|
| Example 1 | Spray drying | 1.5 | 2.7 | 2.8 | 10.6 | 1.5 | 2.7 | 0.25 | 338 | 3.91 |
| Comparative Example 1 | Standing drying | 1.5 | 2.7 | 2.1 | 3.6 | 1.6 | 2.7 | 0.75 | 53 | 3.91 |
| Comparative Example 2 | Standing drying | 3.2 | 5.5 | 3.6 | 6.2 | 3.2 | 5.5 | 0.89 | 248 | 3.86 |
| Comparative Example 3 | Spray drying + Heat-treating | 1.5 | 2.7 | 6.5 | 14.5 | 2.4 | 7.9 | 0.54 | — | 3.89 |

As shown in Table 1, by forming the secondary particles granulated in Example 1, the positive electrode active material having an excellent sieving rate was obtained. In Example 1, the average voltage was increased since the primary particles were regenerated when the electrode was produced by using the granulated secondary particles, and therefore, the positive electrode active material having excellent output characteristics was obtained.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A method for producing a positive electrode active material for a non-aqueous electrolyte secondary battery, comprising:
providing a composition containing a first lithium transition metal composite oxide having a 50% particle size $^1D_{50}$ in a first volume cumulative particle size distribution of 0.1 μm or more and less than 3.2 μm and a first liquid medium; and
granulating the composition to obtain a second lithium transition metal composite oxide having a 50% particle size $^2D_{50}$ in a second volume cumulative particle size distribution greater than $^1D_{50}$, wherein
the second lithium transition metal composite oxide has different volume cumulative particle size distributions before and after an ultrasonic treatment in a second liquid medium,
the second lithium transition metal composite oxide has a ratio of a 90% particle size $^3D_{90}$ in a third volume cumulative particle size distribution measured after the ultrasonic treatment to a 90% particle size $^2D_{90}$ in the second volume cumulative particle size distribution measured before the ultrasonic treatment ($^3D_{90}/^2D_{90}$) of 0.53 or less, and
the second lithium transition metal composite oxide is not subjected to a heat treatment in which heat of 300° C. or higher applies to the second lithium transition metal composite oxide.

2. The method for producing a positive electrode active material for a non-aqueous electrolyte secondary battery according to claim 1, wherein the granulating comprises spray-drying the composition to remove at least a portion of the first liquid medium.

3. The method for producing a positive electrode active material for a non-aqueous electrolyte secondary battery according to claim 1, wherein the second lithium transition metal composite oxide has the $^2D_{90}$ of greater than 3.6 μm.

4. The method for producing a positive electrode active material for a non-aqueous electrolyte secondary battery according to claim 2, wherein the second lithium transition metal composite oxide has the $^2D_{90}$ of greater than 3.6 μm.

5. The method for producing a positive electrode active material for a non-aqueous electrolyte secondary battery according to claim 1, wherein the second lithium transition metal composite oxide has a 50% particle size $^3D_{50}$ in the third volume cumulative particle size distribution measured after the ultrasonic treatment of less than 3.2 μm.

6. The method for producing a positive electrode active material for a non-aqueous electrolyte secondary battery according to claim 3, wherein the second lithium transition metal composite oxide has a 50% particle size $^3D_{50}$ in the third volume cumulative particle size distribution measured after the ultrasonic treatment of less than 3.2 μm.

7. The method for producing a positive electrode active material for a non-aqueous electrolyte secondary battery according to claim 4, wherein the second lithium transition metal composite oxide has a 50% particle size $^3D_{50}$ in the third volume cumulative particle size distribution measured after the ultrasonic treatment of less than 3.2 μm.

8. The method for producing a positive electrode active material for a non-aqueous electrolyte secondary battery according to claim 1, wherein a ratio of a 50% particle size $^3D_{50}$ in the third volume cumulative particle size measured after the ultrasonic treatment of the second lithium transition metal composite oxide to the $^1D_{50}$ ($^3D_{50}/^1D_{50}$) is 0.8 or more and 2 or less.

9. The method for producing a positive electrode active material for a non-aqueous electrolyte secondary battery according to claim 5, wherein a ratio of the $^3D_{50}$ to the $^1D_{50}$ ($^3D_{50}/^1D_{50}$) is 0.8 or more and 2 or less.

10. The method for producing a positive electrode active material for a non-aqueous electrolyte secondary battery according to claim 6, wherein a ratio of the $^3D_{50}$ to the $^1D_{50}$ ($^3D_{50}/^1D_{50}$) is 0.8 or more and 2 or less.

11. The method for producing a positive electrode active material for a non-aqueous electrolyte secondary battery according to claim 7, wherein a ratio of the $^3D_{50}$ to the $^1D_{50}$ ($^3D_{50}/^1D_{50}$) is 0.8 or more and 2 or less.

12. The method for producing a positive electrode active material for a non-aqueous electrolyte secondary battery according to claim 1, wherein a 90% particle size $^1D_{90}$ in the volume cumulative particle size distribution of the first lithium transition metal composite oxide is 0.15 μm or more and 3 μm or less.

13. The method for producing a positive electrode active material for a non-aqueous electrolyte secondary battery according to claim 1, wherein the $^3D_{90}$ is 0.15 μm or more and 3 μm or less.

* * * * *